US005700903A

United States Patent [19]
Hancock et al.

[11] Patent Number: 5,700,903
[45] Date of Patent: Dec. 23, 1997

[54] BLOCK COPOLYMERS

[75] Inventors: Lawrence Francis Hancock, Woburn, Mass.; Alan Jay Kishbaugh, Columbia, Md.; Marc Ellous Parham, Bedford, Mass.

[73] Assignee: Circe Biomedical, Inc., Lexington, Mass.

[21] Appl. No.: 634,238

[22] Filed: Apr. 18, 1996

Related U.S. Application Data

[62] Division of Ser. No. 508,178, Jul. 27, 1995.
[51] Int. Cl.$^6$ .................................................. C08G 75/00
[52] U.S. Cl. ........................ 528/373; 528/499; 528/103; 525/88; 525/96; 521/50
[58] Field of Search ...................... 528/373, 499, 528/503; 525/88, 96; 521/50

[56] References Cited

U.S. PATENT DOCUMENTS

| | | |
|---|---|---|
| 3,247,133 | 4/1966 | Chen. |
| 4,514,304 | 4/1985 | Miyaki et al. |
| 4,812,269 | 3/1989 | Harttig et al. |
| 4,948,508 | 8/1990 | Nakagawa et al. |
| 5,006,256 | 4/1991 | David. |
| 5,232,601 | 8/1993 | Chu et al. |

FOREIGN PATENT DOCUMENTS 1616-935  1/1989  U.S.S.R.

OTHER PUBLICATIONS

M. Amiji et al., "Prevention of Protein Adsorption and Platelet Adhesion on Surfaces by PEO/PPP/PEO Triblock Copolymers", *Biomaterials* 1994, vol. 15 No. 6., 417–422.

Butuc et al., "Modified Polysulfones. I.Synthesis and Characterization of Polysulfones with Unsaturated With Unsaturated End Groups", *J.M.S.–Pure Appl. Chem.*, A31(2), pp. 219–230 (1994).

Klein et al., "Affinity Membranes Prepared From Hydrophillic Coatings On Microporous Polysulfone Hollow Fibers", *Journal of Membrane Science*, 90 (1994) 69–80.

Lomasney, "A Study of Fabrication and Characterization of PSF Ultrafiltration Membranes With PEO–PSF Block Copolymer Additives", *Abstract of Thesis submitted to the faculty of the Department of Plastics Engineering to the University of Massachusetts Lowell*, 1995.

T. Matsuda et al., "Surface Coating of Hydrophilic–hydrophobic Block Co–polymers On A Poly(acrylonitrile Haemodialyser Reduces Platelet Adhesion and Its Transmembrane Stimulation", *Biomaterials* vol. 15 No. 6 (1994) pp. 417–422.

M.S. Shoichet et al., "Materials Used in Devices for the Treatment of Neurological Disorders", *Polymer Material S.E.*, Fall 1994, vol. 71, p. 16.

*Primary Examiner*—James J. Seidleck
*Assistant Examiner*—Duc Truong
*Attorney, Agent, or Firm*—Fish & Richardson P.C.

[57] ABSTRACT

A poly(ethyleneoxy) block copolymer including a hydrophobic block segment useful in making a porous polymer article with improved surface hydrophilicity. Also disclosed is a method of making such a polymer article.

20 Claims, No Drawings

BLOCK COPOLYMERS

This is a divisional of copending application Ser. No. 08/508,178, filed Jul. 27, 1995.

BACKGROUND OF THE INVENTION

Desirable separation membranes are strong, thermally-stable, and resistant to oxidative or corrosive elements in the material to be separated such as acids or chloride ions. Hydrophobic polymers such as polysulfones often provide the above characteristics. When aqueous or polar materials are to be separated, however, a hydrophilic surface is also desirable. A hydrophilic or wettable surface on a porous polymer promotes uniform filtration, increases recovery of both filtrate and retentate, and decreases adsorption of material such as protein and other solutes (i.e., fouling). It is worth noting that the surface energies associated with small-diameter pores hamper both an initial wetting of a porous surface, and also a re-wetting of the surface after the membrane has been dried.

In addition to one method which simply blends hydrophobic polymers with a hydrophilic additive or alloy, there are several methods of treating pre-formed polymer membranes to increase surface hydrophilicity. For example, one method relies on hydrophobic bonding between a pre-formed hydrophobic polymer and an adsorptive coating. Much activity has focused on derivatizing functional groups exposed on the surface of a pre-formed polymer with surface modifying ligands. One method prepares a copolymer with derivatizable functional groups, such as poly[acrylonitrile-co-hydroxyalkyl(meth)acrylate]. Other methods include direct sulfonation, hydroxyalkylation, or other derivatization of reactive functional groups on a pre-formed polymer membrane.

SUMMARY OF THE INVENTION

One aspect of the invention relates to a hydrophilic-hydrophobic diblock copolymer or a hydrophilic-hydrophobic-hydrophilic triblock copolymer, or a combination thereof. An example is a block copolymer of formula (I):

$$R-(OCH_2CH_2)_n-X-Y \qquad (I)$$

R is $C_{1-20}$ alkyl (e.g., $C_{6-20}$ alkyl), $C_{7-20}$ alkylaryl, $C_{7-20}$ arylalkyl, or $C_{1-20}$ perfluoroalkyl (e.g., $C_{6-20}$ perfluoroalkyl). The value of n is between 20 and 500 (e.g., between 20 and 400, or between 20 and 300). X is $-Z^1-(OAr^1OAr^2)_m-$ or $-(OAr^2OAr^1)_m-$. Y is hydroxy, $-(OAr^3O)-Z^2-(CH_2CH_2O)_p-R^1$, or $-(OAr^4O)-(CH_2CH_2O)_p-R^1$. $Z^1$ is selected from $-N(R^2)-(SO_2)-C_6H_4-$ and $-N(R^2)-(C=O)-C_6H_4-$, $R^2$ being $C_{1-12}$ alkyl or $C_{6-20}$ aryl. $Z^2$ is selected from $-C_6H_4-(SO_2)-N(R_3)-$ and $-C_6H_4-(C=O)-N(R_3)-$, $R^3$ being $C_{1-12}$ alkyl or $C_{6-20}$ aryl. $R^1$ is $C_{1-20}$ alkyl, $C_{7-20}$ alkylaryl, $C_{7-20}$ aryl-alkyl, or $C_{1-20}$ perfluoroalkyl. For example, each of $R^1$ and R is selected from lauryl, myristyl, palmityl, stearyl, cetyl, methyl, phenyl, octylphenyl, nonylphenyl, and perfluoroalkyl, or any of possible combinations thereof. In certain embodiments, R and $R^1$ are the same. Each of $Ar^1$ and $Ar^3$ is independently selected from 1,4-phenylene, 1,3-phenylene, naphthyl-1,4-diyl, naphthyl-1,5-diyl, 4,4'-biphenylene, diphenyl ether-4,4'-diyl, diphenylthioether-4,4'-diyl, diphenylisopropyl-idene-4,4'-diyl, diphenylhexafluoroisopropylidene-4,4'-diyl, diphenylalkylene-4,4'-diyl wherein alkylene is $-(CH_2)_q-$, q being 1, 3, 5, 7 or 9, p-terphenyl-4,4'-diyl, and bivalent radicals of binaphthalene, anthracene, and phenylnaphthalene. Preferably, $Ar^1$ is diphenylisopropylidene-4,4'-diyl or diphenylhexafluoroisopropylidene-4,4'-diyl. In certain embodiments, $Ar^1$ and $Ar^3$ are the same. Each of $Ar^2$ and $Ar^4$ is independently selected from diphenylsulfoxide-4,4'-diyl, diphenylsulfone-4,4'-diyl, diphenyl ketone-4,4'-diyl, and bivalent radicals of diphenyl-$C_{1-12}$ alkyl phosphine oxide and diphenyl-$C_{6-20}$ aryl phosphine oxide. $Ar^2$ is preferably diphenylsulfone-4,4'-diyl or diphenyl sulfoxide-4,4'-diyl. In certain embodiments, $Ar^2$ and $Ar^4$ are the same. The value of m is between 1 and 250 (e.g., between 1 and 200, or between 10 and 250). The value of p is between 20 and 500 (e.g., between 20 and 400, or between 20 and 300). In one embodiment, $Z^1$ is $-N(R_2)-(SO_2)-C_6H_4-$ and $Z^2$ is $-C_6H_4-(SO_2)-N(R^2)-$. The weight ratio of $(OCH_2CH_2):(OAr^1OAr^2)+(OAr^2OAr^1)$ is between 5:1 and 1:20, e.g., between 3:1 and 1:10. Throughout this disclosure, all numerical ranges (e.g., ratios, temperatures, weight percents, and integer values of m, n, and p) are understood to be inclusive.

Another aspect of the invention relates to a porous polymer article with a covalently-bonded hydrophilic moiety present on its active surface. The polymer article includes (i) a hydrophilic-hydrophobic block copolymer (such as a hydrophilic-hydrophobic diblock copolymer, or a hydrophilic-hydrophobic-hydrophilic triblock copolymer, or a combination thereof, e.g., formula (I)), and (ii) a hydrophobic polymer. The polymer matrix of the article is formed by the hydrophobic polymer mixing with hydrophobic block segments of the block copolymer. A hydrophilic moiety includes a partial length or portion of a hydrophilic block segment of the block copolymer.

Still another aspect of the invention relates to a method of making a porous polymer article with enhanced hydrophilicity including three steps. The first step is providing a casting solution which includes (i) 0.1–50 weight percent of a block copolymer of formula (I), (ii) 0–40 weight percent of a hydrophilic polymer, and (iii) 40–95 weight percent of a polar aprotic solvent. The second step is contacting the casting solution with a nonsolvent coagulation bath until a porous polymer article forms. The third step thermally annealing the article in the presence of water to enhance the hydrophilicity of the article.

Some important terms used in this disclosure are defined or exemplified below:

The term "active surface" means the total surface area, including pores and channels, exposed to a filtrate. The invention features block copolymers designed to form polymer articles such as membranes which spontaneously undergo a phase inversion to form an active surface (e.g., a hydrophilic surface). As a result of the design of the block copolymer and the method of formation, the active surface generally extends across the exterior membrane faces and generally extends through the interior pore surfaces and channels. The active surface of an article is therefore generally greater than the macroscopic or planar dimension. Thus, a 4 inch by 4 inch membrane has an active surface greater than 16 square inches.

The term "active surface block segment," or active surface segment, refers to a block segment of a copolymer which is localized at least in part on the active surface of a polymer article during membrane formation (e.g., poly (oxyethylene) block segment in Example 1). Such localization or presentation results from careful selection of casting solution solvent, block copolymer, additives, temperature, matrix-forming polymer, and coagulation bath medium. An active surface block segment is covalently-bound to an anchor segment of the same block copolymer. An anchor segment (e.g., polysulfone block segment in Example 1) can mix with a matrix-forming polymer (e.g., hydrophobic polymer) to form a polymer matrix. The bond between an anchor segment and an active surface segment may be literally a single covalent bond, or may be a linking moiety, such as an ether linkage (—O—), an amide, ester, or sulfonamide linkage, a monomer or any other organic moiety which does not adversely affect either solvent quality of the casting solution or membrane formation (e.g., —N($R^2$) —($SO_2$)—$C_6H_4$— and —N($R^2$)—(C=O)—$C_6H_4$—).

The term "active surface segment moiety" means a portion of a block copolymer segment which is present on, or extends above, the active surface of a polymer article. An active surface segment moiety may be attached to the polymer article at one end (with a second end extending "free" above the active surface) or it may be attached at both ends, as a "loop" appearing on, or extending above, the active surface. An active surface segment moiety has a property different from the bulk or matrix polymer, such as hydrophilicity, chirality, or a specific reactivity or affinity. Active surface segment moieties and presentation thereof are further addressed in the Detailed Discussion section below.

The term "alkyl" includes straight-chain groups such as methyl, n-hexyl, nonyl, tetradecyl, and icosyl; branched groups such as isopropyl, isopentyl, neopentyl, tert-pentyl, 4-ethyl-5-methyloctyl, and 4-isopropyl-5-propyl-nonyl; and cyclic alkyl groups such as cyclopropyl, cyclopentyl, and 2-methyl-4-ethylcyclohexyl.

The term "bivalent radical" means a structural moiety with two free valences. The bivalent radical is bonded to two other moieties at the sites of the two valences. When bivalent formulas are provided, the following convention should be noted. For example, in formula (I) R—($OCH_2CH_2$)$_n$—X—Y, X can be —$Z^1$—($OAr^1OAr^2$)$_m$—, wherein $Z^1$ is —N($R^2$) —($SO_2$)—$C_6H_4$—. The left-terminal atom of X (i.e., the nitrogen atom of $Z^1$) is bonded to the right-terminal carbon atom of R—($OCH_2CH_2$)$_n$—. Similarly, the right-terminal carbon atom of X (carbon of rightmost $Ar^2$) is bonded to the left-terminal atom of Y. Note that $Z^2$ moieties are the same as $Z^1$ moieties except that the orientation of these bivalent moieties has been horizontally reversed or flipped. This relationship is also observed in the use of (oxyethylene) and (ethyleneoxy). Scheme I provides additional examples of bivalent radicals.

SCHEME I

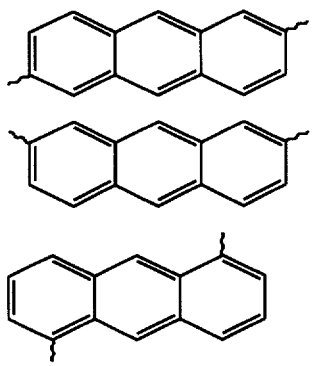

-continued
SCHEME I

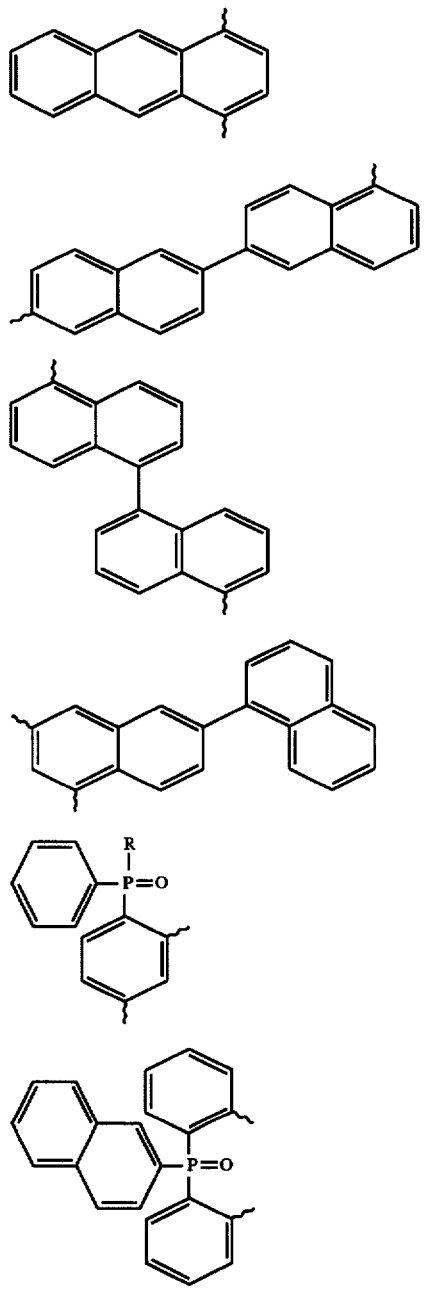

The term "perfluoroalkyl" means fully-fluorinated straight-chain carbon chains, such as trifluoromethyl and pentafluoroethyl. Perfluoroalkyls can be generalized by $C_nF_{2n+1}$.

The term "hydrophilic" as in "hydrophilic active surface" means the same as wettable, or capable of forming at least some hydrogen bonds with water by means of polar atoms or groups of atoms. Hydrophilicity can be measured macroscopically by measuring, e.g., water contact angle, permeability, solvent flux, and solute rejection. Even after being dried, a spontaneously wettable surface requires little or no additional surfactant or humectant. Certain polymer articles which include the disclosed block copolymers are spontaneously wettable (see, e.g., Example 3).

The term "weight percent" as used above to describe a casting solution means, for example, the weight of a component (e.g., block copolymer, solvent, matrix polymer, or additive, if any) divided by the total weight of the casting solution and then multiplied by 100.

The polymer articles disclosed herein are useful in aqueous separation processes such as microfiltration, ultrafiltration, dialysis, osmosis, reverse osmosis, ion exchange, or electrodialysis, or a combination thereof. Applications include water treatment, cell culturing, artificial organs, and food processing.

Other features and advantages of the present invention will be apparent from the following detailed description, and also from the appending claims.

DETAILED DESCRIPTION OF THE INVENTION

The invention features a block copolymer used to make a porous polymer article having a plurality of active surface block segment moieties on the active surface of the article, wherein the active surface block segments are covalently bound to, and yet have properties different from, the interior anchor block segments of the article. The invention includes the porous polymer article, and a method of making it.

The disclosed block copolymers are first described generally by their relationship and function in a method of making porous polymer articles. These articles (e.g., flat sheet or hollow fiber membranes) are formed by a wet-casting method. Briefly, a casting solution is cast into a liquid coagulation medium. A casting solution includes a block copolymer (e.g., A-b-B), a matrix-forming (or bulk) polymer (B'), and a solvent. According to the invention, diblock copolymer A-b-B includes a first block segment A which has a greater affinity for the coagulation medium than for the casting solution solvent, and a second block segment B which can mix with a desired matrix-forming polymer B'. The coagulation medium is a nonsolvent with respect to the matrix-forming polymer, i.e., the coagulation medium does not dissolve the matrix-forming polymer. B and B' have an affinity for each other that results in mixing. Mixing includes physical entanglement, co-crystallization, ionic interactions, electron donor-acceptor interactions, intermolecular actions such as hydrogen bonding and van der Waals interactions, and combinations thereof.

The invention is based, in part, on the discovery of the following. During membrane formation, portions of the first block segment A (which has a greater affinity for the coagulation medium) localize at the interface between the coagulation medium and the casting solution solvent. Meanwhile, the second block segment B mixes with the matrix-forming polymer B' to form a polymer matrix. Although portions of the first block segment are localized on the active surface of the polymer article, the first and second block segments remain covalently-bonded to each other. Thus, the first block segment is covalently bound to the second block segment which, in turn, is mixed with or anchored to the matrix-forming polymer. The resulting polymer article, therefore, has an organized structure with portions of active surface segments present across the active surface of the article.

Any portion or moiety of a block segment may be present on the active surface of an article; surface presentation of the entire segment is not required. Thus, where a block copolymer has a PEO block —(OCH$_2$CH$_2$)$_{200}$—, a PEO block segment moiety could be 50%, 35%, or 10%, or more, or less, of the 200-monomer length. It is possible that a relatively long single block segment gives rise to two or more active surface segment moieties which are connected to each other by a portion of the block segment that is not presented at the surface. However, the design of the disclosed block copolymers favors presentation of one active surface segment moiety per block segment. Furthermore, in certain embodiments the active surface segment moieties are uniformly present across the active surface of the article. The uniformity (i.e., more or less even or average distribution of active surface segments) can be measured by methods such as X-ray photoelectron spectroscopy. In certain embodiments which include PEO, the density of active surface segment moieties (i.e., PEO moieties) is sufficient to impart macroscopically-detectable hydrophilicity to the active surface (e.g., low water contact angle). A plurality of active surface segments (e.g., membrane-integrated or covalently-bonded hydrophilic moieties) means two or more active surface segments to create an active surface with the desired property or properties, such as degree of hydrophilicity. The above descriptive principles encompass block copolymers and membranes formed therefrom, wherein the block copolymer is a diblock (A-b-B), a triblock (e.g., A-b-B-b-A or A-b-B-b-C, where C has a higher affinity for A and the coagulation medium, than for B and the casting solution solvent), a tetrablock, etc., or combinations thereof.

A specific example is now provided. One of the disclosed casting solutions includes a poly(ethylene oxide)-b-polysulfone-b-poly(ethylene oxide) triblock copolymer, a hydrophobic (matrix-forming) polysulfone polymer, and N-methylpyrrolidinone as a casting solution solvent. This triblock copolymer includes (1) a hydrophobic polysulfone (PSF) block segment which is miscible with a hydrophobic matrix-forming polymer which may be the same (PSF) or different, between (2) two terminal hydrophilic poly (ethylene oxide) (PEO) block segments which have a greater affinity for an aqueous coagulation medium containing water than for N-methyl-pyrrolidinone, the casting solution solvent. In this example, the miscible PSF block segment anchors the entire triblock copolymer to the PSF polymer matrix (e.g., membrane). The hydrophilic active surface PEO moieties are presented at the active surface of the membrane, and yet the PEO block remains covalently bonded to the PSF membrane matrix. Note that the active surface moiety (here, the PEO) is integral to the block copolymer, and is incorporated, via the casting solution, into the membrane during formation. In other words, the surface of a polymer article made according to the invention requires neither reactive functional groups nor subsequently derivatized functional groups to increase surface hydrophilicity.

A polymer article containing one or more disclosed block copolymers has improved performance. For example, addition of a PEO-b-PSF-b-PEO triblock copolymer improves performance by increasing water permeability and protein recovery (resistance to protein adsorption), and decreasing cytochrome-C rejection. One of the unexpected results of the disclosed block copolymers is the superior performance of membranes made therefrom when treated with only a fraction (e.g., a 5% solution of glycerol) of the usual amount of surfactant or humectant. According to the invention, hydrophilic active surface segments are permanently integrated into the polymer during polymer formation. Therefore, no further functionalization or derivatization is required, which shortens the manufacture time and simplifies the machinery necessary to make the disclosed polymer articles. The hydrophilic surface results from membrane-integrated active surface segments which are covalently-bonded to the polymer matrix during membrane formation. When such a polymer membrane is used in a separation process, both the retentate and filtrate are therefore free of certain contaminants. Examples of contaminants include chemical residues associated with derivatized membranes (reactants, work-up reagents, solvents); and leached or deposited materials associated with membranes with non-covalently bonded coatings. More specific descriptions are provided immediately below.

Block Copolymer

One aspect of the invention relates to a block copolymer having the formula (I) as described in the Summary. According to the invention, a block copolymer generally includes two block segments with different properties. For example, in one aspect, a block copolymer has a hydrophilic block segment and a hydrophobic block segment. Hydrophobic and hydrophilic are relative terms well-known to those in the art. Hydrophilic polymers include peptides, dialkylacrylamides, and preferably poly(ethylene oxide) (PEO). PEO is commercially available in a variety of molecular weights including 600, 1000, and 5000. Certain embodiments include PEO in the higher available molecular weight range. Hydrophobic polymers include polyalkylmethacrylates, polyphenylene, and preferably polyacrylonitrile, polyvinyl halides, polyvinylidene halides, polyimide, polyamide, polyetherimide, and even more preferably poly(arylethers) such as homopolymers of —(OAr$^1$OAr$^2$)— (e.g., wherein Ar$^2$ is polyether sulfone or polysulfone). Halides include bromides, iodides, and preferably fluorides and chlorides.

The invention contemplates the use of combinations of diblock and triblock copolymers, and combinations of different block copolymers, e.g., nonylphenyl poly(oxyethylene)-b-poly(aryl ether sulfone)-b-poly(ethyleneoxy)phenylnonyl and perfluoroalkyl poly(oxyethylene)-b-poly(aryl ether sulfone), to make porous polymer articles such as flat sheet or hollow fiber membranes. Examples of pairs of diblock and corresponding triblock copolymers include methyl poly(oxyethylene)-b-poly(aryl ether sulfone) and methyl poly(oxyethylene)-b-poly(aryl ether sulfone)-b-poly(ethyleneoxy)methyl; phenyl poly(oxyethylene)-b-poly(aryl ether sulfone) and phenyl poly(oxyethylene)-b-poly(aryl ether sulfone)-b-poly(ethyleneoxy)phenyl; stearyl poly(oxyethylene)-b-poly(aryl ether sulfone) and stearyl poly(oxyethylene)-b-poly(aryl ether sulfone)-b-poly(ethyleneoxy)stearyl; cetyl poly(oxyethylene)-b-poly(aryl ether sulfone) and cetyl poly(oxyethylene)-b-poly(aryl ether sulfone)-b-poly(ethyleneoxy)cetyl; lauryl poly(oxyethylene)-b-poly(aryl ether sulfone) and lauryl poly(oxyethylene)-b-poly(aryl ether sulfone)-b-poly(ethyleneoxy)lauryl; octylphenyl poly(oxyethylene)-b-poly(aryl ether sulfone) and octylphenyl poly(oxyethylene)-b-poly(aryl ether sulfone)-b-poly(ethyleneoxy)phenyloctyl; nonylphenyl poly(oxyethylene)-b-poly(aryl ether sulfone) and nonylphenyl poly(oxyethylene)-b-poly(aryl ether sulfone)-b-poly(ethyleneoxy)phenylnonyl; and perfluoroalkyl poly(oxyethylene)-b-poly(aryl ether sulfone) and perfluoroalkyl poly(oxyethylene)-b-poly(aryl ether sulfone)-b-poly(ethyleneoxy)perfluoroalkyl.

Note that in formula (I), X is —Z$^1$—(OAr$^1$OAr$^2$)$_m$— or —(OAr$^2$OAr$^1$)$_m$—. In other words, in the second bivalent formula, there are m —(OAr$^2$OAr$^1$)— units. An alternative expression for this block is —(OAr$^2_i$OAr$^1_i$)$_i$—, where i is 1 to m. Similar expressions exist for the other block segments involving n and p. The methods of making a block copolymer permit wide variation, such that Ar$^1$ and Ar$^2$ in one —(OAr$^2$OAr$^1$)— unit may differ from the Ar$^1$ and Ar$^2$ in another (e.g., adjacent) —(OAr$^2$OAr$^1$)— unit. In other words, each of Ar$^1_1$ and Ar$^1_2$ is independently selected. The term "each of Ar$^1$ and Ar$^3$ is independently selected from" is therefore understood to encompass such "mixed" blocks. However, it is preferred that 90% of the m units are the same.

Synthesis of a Block Copolymer

The invention is based, in part, on the design of a block copolymer consistent with the principles described above. After discovery of these principles, synthesis of a specific block copolymer is straightforward, and is accomplished by numerous routes known or easily determined by those in the art. Two exemplary synthetic routes are provided here.

SCHEME II

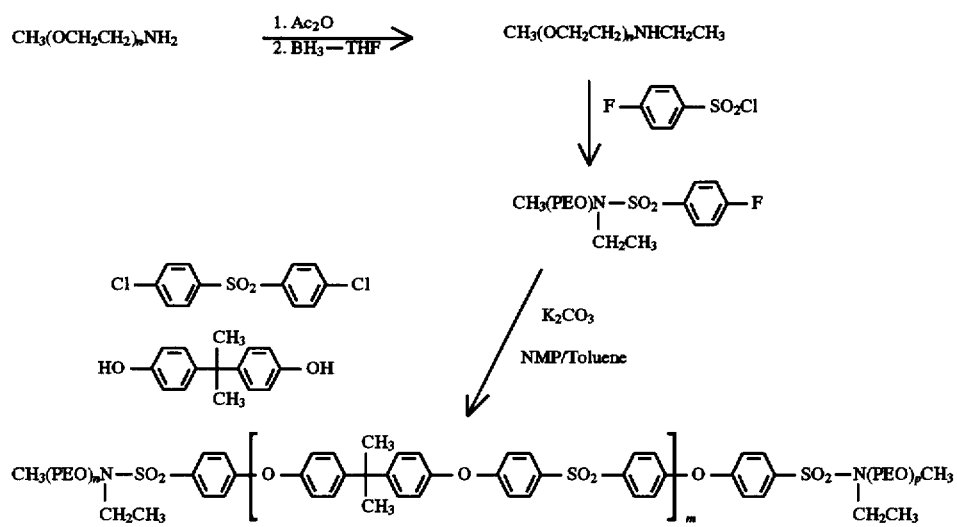

-continued
SCHEME II

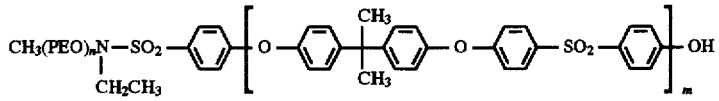

SCHEME III

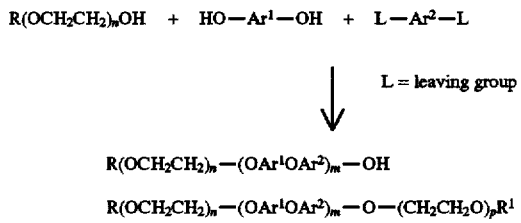

Scheme II illustrates the preparation of a poly(oxyethylene)-b-polysulfone-b-poly(ethyleneoxy) triblock copolymer by condensation. First, a PEO chain-terminating monomer is reacted with a reactive 4-fluorophenyl sulfonamide end group. Second, the PEO chain terminating monomer is reacted with 4,4'-isopropylidene diphenol and bischlorophenyl sulfone. Using mixtures of dihydroxy or dihalo reagents results in mixed-component block copolymers.

Scheme III illustrates an alternative preparation, wherein a PEO-block alcohol, an aryl diol, and a reactive difunctionalized (e.g., dihalo, dinitro, or halo-nitro) aryl reagent (e.g., bischlorophenyl sulfone) are reacted to form a combination of diblock and triblock copolymers. Reacting the three reactants in stoichiometric proportions where the ratio of PEO:diol:sulfone is 2n:m:(n+m) yields a high rate of endcapping. In other words, high-molecular weight triblock copolymers such as PEO-PSF-PEO are predominantly formed. On the other hand, the ratio of PEO:diol:sulfone can be q:r:r. Thus reacting equal amounts of the difunctional reactants (e.g., diol and sulfone) and some amount of endcapping reactant (e.g., polyethyleneoxy) generally yields a mixture of triblock copolymer, diblock copolymer, and homopolymer polysulfone. One embodiment includes 10–80 weight percent; another includes 15–40 weight percent of PEO. The latter embodiment is particularly suitable to form hollow fiber membranes for dialysis.

Polymer Article

One aspect of the invention is a porous polymer article with a covalently-bonded hydrophilic moiety present on its active surface as described in the Summary section. The porous polymer article includes (i) a hydrophilic-hydrophobic diblock copolymer, a hydrophilic-hydrophobic-hydrophilic triblock copolymer, or a combination thereof, and (ii) a hydrophobic polymer. A hydrophobic moiety of the diblock or triblock copolymer mixes with the hydrophobic polymer to form a polymer matrix. For example, the polymer article has up to 80 weight percent of one or more block copolymers (e.g., in weight percents, between 0.01 and 80, between 5 and 50, and between 15 and 40). In one embodiment, the article includes a diblock copolymer (i.e., Y is hydroxy); in another embodiment, the article includes a triblock copolymer (Y is disclosed or undisclosed moiety that is not hydroxy).

Synthesis of a Polymer Article

Formation of polymer articles (e.g., flat sheet or hollow fiber membranes) with a disclosed block copolymer is adapted from methods known in the art, provided that the casting solution solvent, the coagulation bath medium, the temperature, and other conditions known and understood in the art are selected in a manner consistent with the invention as described above. One aspect of the invention relates to a method of making a porous polymer article with enhanced hydrophilicity including three steps as described in the Summary section. However, the invention is also based, in part, on the discovery that after a polymer article is formed, thermally annealing the article enhances the already-superior or desirable performance properties.

The first step in preparing a polymer article is providing a casting solution. The disclosed block copolymers are used to prepare a casting solution which includes a block copolymer, a matrix-forming polymer, and a polar aprotic organic solvent. In general, a casting solution includes up to 80% solids, i.e., the sum of block copolymer and matrix polymer is less than or equal to 80% (e.g., less than or equal to 50, 40%, or 35%; or between 5% and 25%). A person of ordinary skill in the art can easily determine whether, and how much, heating is necessary and appropriate to form an acceptably homogenous casting solution.

Specific examples of block copolymers are described above. A casting solution may include either a single block copolymer or a combination of two or more block copolymers in any desirable proportion. A casting solution includes between 0.1 and 50 weight percent (e.g., 5–35 or 10–30 weight percent) of a disclosed block copolymer, or a combination of disclosed block copolymers.

A hydrophobic matrix-forming polymer is a rigid block polymer known in the art, or a nonblock polymer such as a homopolymer of bischlorophenyl sulfone. The weight percent of the hydrophobic polymer is 0.1–30 weight percent (e.g., 5–20 weight percent) of the casting solution. Examples of hydrophobic polymers include the group consisting of polyacrylonitrile, polyvinyl halide, polyvinylidene halide, polyimide, polyetherimide, and polyamide, and polymers of —(OAr$^1$OAr$^2$)—, or a copolymer thereof. In one embodiment, the hydrophobic polymer is a polymer or copolymer of —(OAr$^1$OAr$^2$)—, wherein Ar$^2$ is, e.g., diphenylsulfone-4,4'-diyl.

The casting solution includes between 40 and 95 weight percent (e.g., between 50 and 90 weight percent, or between 65 and 90 weight percent) of a solvent or solvent system. Suitable polar aprotic organic solvents include N-methylpyrrolidinone (NMP), dimethylformamide, dimethylacetamide, 4-butyrolactone, and a solvent system thereof. For example, a solvent system may include toluene or water, provided the solvent quality is maintained. In one embodiment, the polar aprotic solvent is N-methyl pyrrolidone.

In addition to a block copolymer, a hydrophobic polymer, and a solvent, other additives may be included, provided that the adjusted solvent quality is not so adversely affected that precipitation occurs. Examples of such solvent quality-adjusting additives include a hydroxyl-containing reagent such as polyethylene glycol (commercially available in molecular weights such as 300, 400, 600, 900, 1000, 1,500, 2,000, 8,000 and 10,000), water, and low molecular weight alcohols (e.g., $C_{1-8}$ alcohols); and soluble salts such as lithium chloride, present in 0.1–7 weight percent, e.g., 2–6 weight percent. For example, the casting solution may further include 5–30 weight percent (e.g., 10–28 weight percent) of a hydroxyl-containing reagent selected from polyethylene glycol (e.g., molecular weight of 300, 400, or 600), water, and $C_{1-8}$ alkanols. Additives also include those additives well-known in the art such as small amounts of colorants. Coagulation temperatures range from 18°–90° C. (e.g., 18°–50° C.).

Specific casting solutions are found in the examples below. Disclosed casting solutions include (in weight percents): 10 weight percent block copolymer, 10 weight percent polysulfone, and 80 weight percent polar aprotic solvent; 10 weight percent block copolymer, 15 weight percent polysulfone, 25 weight percent polyethylene glycol, and 50 weight percent polar aprotic solvent; or 15 weight percent block copolymer, 5 weight percent polysulfone, and 80 weight percent polar aprotic solvent. Some casting solutions consist of disclosed block copolymers, polysulfone, NMP, and a soluble salt such as lithium chloride.

A person of ordinary skill in the art can easily determine the composition of a suitable nonsolvent coagulation bath medium, based on the block copolymer, particularly the block segment to be presented on the active surface, the casting solution solvent, the matrix polymer, and the desired pore structure of the polymer article. In general, the solvent and solvent additives should be soluble in the coagulation medium, and the hydrophilic matrix polymer should precipitate in the coagulation medium. Examples of coagulation media include of NMP and water in combinations such as 0% NMP-100% water, 50% NMP-50% water, 70% NMP-30% water, and 80% NMP-20% water.

In one example of making a polymer article, a casting solution was spread onto sheets of nonwoven polypropylene fabric taped to glass plate supports and immersed in a coagulation medium of reverse osmosis-processed water at room temperature. After precipitation, the membrane including the integrated support sheet was placed in a second water bath to remove residual solvent (NMP) and pore former (e.g., polyethylene glycol or PEG). The rinse water was repeatedly changed for 24 hours to improve diffusion. Then the membranes were placed in 30%/70% v/v glycerol solution for 24 hours, placed between two sheets of blotting paper, dried at room temperature, and stored in air-tight bags.

Although thermal annealing is not necessary to produce a porous, polymer article which includes a block copolymer of the invention, such treatment is preferable, since it was found to enhance the hydrophilic or wetting properties of polymer articles of the invention to an unexpected degree in an unexpected way.

In general, autoclaving increases the membrane molecular weight cut-off. However, when membranes of the invention were thermally annealed, the molecular weight cut-off was found to stay the same or even decrease. For example, it is believed that in membranes containing PEO, thermal annealing in the presence of water enhances the degree of PEO presentation, and the overall distribution of PEO active surface segments.

According to the invention, thermal annealing generally occurs in the presence of water (e.g., a water bath or an autoclave). In one embodiment, the thermal annealing step includes heating the article in an autoclave at a temperature between 95° and 130° C. (e.g., between 100° and 125° C.). In another embodiment, the thermal annealing step includes heating the article at a temperature between 40° and 90° C.

(e.g., between 45° and 75° C.). The annealing temperature and annealing time generally have an inverse relationship. In one example, thermal annealing included heating the article at about 120° C. for approximately 30 minutes. In another example, thermal annealing was performed at about 50° C. for approximately 24 hours. In each case, the hydrophilicity of the thermally annealed membrane after being dried was measurably increased when compared to a membrane of the same composition after being dried (see Tables III, VI, and VII). Thermal annealing drastically improves the useful life of the membrane by increasing the wettability or hydrophilicity of a membrane even after all liquid solvent has been removed (dried).

Polymer articles were characterized by several methods known to those in the art. Such methods include characterization by Fourier-transformed infrared spectroscopy (FTIR); solid state proton and $^{13}C$ NMR (with a paramagnetic relaxation agent such as $Cr(acac)_3$ to determine organization of the block copolymer at the membrane interface; porometry and scanning electron microscopy (SEM) to determine morphology (homogeneity, porosity); measurement of contact angle and bubble point to determine hydrophilicity; gel permeation chromatography (GPC) to determine molecular weight $M_n$; and differential scanning calorimetry to determine $T_g$. Characterization also included performance characteristics such as water flux, solute flux, and solute rejection. Additional parameters include resistance to protein adsorption, sponge thickness, top pore size, finger length, and casting solution viscosity. These parameters are measured by methods known to those in the art.

Without further elaboration, it is believed that the present invention can be utilized to its fullest extent. The following examples, therefore, are to be construed as illustrative, and not limitative, of the remainder of the disclosure.

EXAMPLE 1

A 50% PEO/50% PSF block copolymer (5 kD) was synthesized as follows. Reflux apparatus was purged with argon. Methyl poly(oxyethylene) with a terminal hydroxyl (200 g, 0.04 moles), bisphenyl disopropylidene-4,4'-diol (Bisphenol A, 114.145 g, 0.5 moles), and bischlorophenyl-sulfone (149.328 g, 0.52 mole) were added to 600 mL N-methylpyrrolidinone and 150 mL toluene and potassium carbonate (143.5 g, 1.04 moles). The reaction mixture was slowly heated over 0.5 hours until an azeotrope reflux was reached (about 160° C.). After an additional hour of reflux, 10.0 mL water was collected via azeotrope and 50 mL toluene was removed. The temperature was raised to 175° C. and an additional 3.5 mL water was collected. Azeotrope ceased after an additional 1.75 hours, 80 mL toluene was removed, and the temperature was raised to 190° C. After polymerization for 7.5 hours, the heat source was removed, and the reaction vessel was cooled to room temperature. The product precipitated in a solution of 100 mL concentrated hydrochloric acid and 10 L water. After repeated filtration and extraction with water, the polymer product was allowed to dry in ambient conditions overnight, and then at 50° C. under vacuum (1–5 mm Hg).

EXAMPLE 2

A casting solution containing 5.0 weight percent PEO-PSF-PEO (a PEO:PSF::30:70 block copolymer), 13.5 weight percent polysulfone, 6.5 weight percent polyethylene glycol (M.W. 400), and 75.0 weight percent N-methyl pyrrolidinone was prepared. The solution was prepared in a glass jar and placed on a roll mixer for 24–48 hours until a single phase solution was obtained. Flat sheet membranes were prepared by casting a 0.015 inch coating of the casting solution onto a glass plate or a nonwoven polypropylene support (Freudenberg). The coated support was immersed in a coagulation water bath until precipitation. After additional extraction with water, the membranes were immersed in a 30% glycerol/water solution for a minimum of 1 hour. One group of membranes were dried in ambient conditions. A second group of membranes, after drying in ambient conditions, were immersed in a water bath and thermally annealed in an autoclave at 121° C. for 30 minutes and allowed to dry at ambient conditions. A third group of membranes was simply removed from the extraction bath and allowed to dry at ambient conditions. The resulting membranes were cut into discs having a 47 mm diameter and evaluated by filtering 20 ml of a 0.1% Cytochrome-C solution therethrough until a 50% volume reduction was achieved.

EXAMPLE 3

A casting solution containing 10.0 weight percent PEO-PSF-PEO (a PEO:PSF::30:70 block copolymer), 10.0 weight percent PSF, 5.0 weight percent polyethylene glycol, and 75.0 weight percent N-methyl pyrrolidinone was prepared. Membranes were prepared according to Example 2 except the above casting solution was used.

The block copolymer membranes of Example 3 were also tested for water permeability and filtration. After extraction with water, the membranes were thermally annealed by heating in a water bath at 121° C. for 30 minutes in an autoclave. The membranes were then dried at room temperature, and compared with two polysulfone membranes made of 15% PSF, 10% PEG MW 400 and 75% NMP; one dried with 30% glycerol (PSF 1) and one dried without glycerol or surfactant (PSF 2). The data indicate that the disclosed membranes, even when dry, spontaneously wetted with water (see Table I). In contrast, to impart wettability to the conventional polysulfone membranes, treatment with a surfactant was required (e.g. 30% glycerol). The results also indicate that the disclosed membrane had a 30–50 kD molecular weight cut-off, and had a solute recovery rate superior to the reference polysulfone membranes.

TABLE I

| PERMEABILITY | | | |
|---|---|---|---|
| | Water | Flux Cytochrome-C | Bovine Serum Albumin |
| EX. 3 | 0.42 | R flt 9% | R flt 79% |
| | | R ret 0% | R ret 80% |
| | | Rec 97% | Rec 100% |
| | | Flx 0.21 | Flx 0.08 |
| PSF 1 | 0.21 | R flt 49% | R flt 97% |
| | | R ret 2% | R ret 88% |
| | | Rec 76% | Rec 94% |
| | | flx 0.13 | flx 0.05 |
| PSF 2 | no flow | no flow | no flow |

EXAMPLE 4

A casting solution containing 15.0 weight percent. PEO-PSF-PEO (a PEO:PSF::30:70 block copolymer), 5.0 weight percent of PSF, 80.0 weight percent of N-methyl pyrrolidinone was prepared. Membranes were prepared according to Example 2 except that the above casting solution was used and the mixture was coagulated in a 3:1::NMP:water bath. After coagulation, the membranes were placed in a secondary extraction bath of pure water for a minimum of 12 hours and dried under ambient conditions.

Membranes obtained via Example 3 were characterized by observation via SEM and solid state NMR, and by measurement of water permeability, solute permeability, and protein adsorption. The NMR results are presented below in Table II.

TABLE II

| PEO PRESENTATION ON ACTIVE SURFACE | | |
|---|---|---|
| Material | $T^H_{1\rho}$ (PSF) | $T^H_{1\rho}$ (PEO) |
| PSF | 5.2 | |
| PSF/Triblock | | |
| (dry membrane) | 5.5 | 8.0 |
| +Cr(acac)$_3$/D$_2$O | 5.1 | 4.9 |
| +D$_2$O | 5.0 | 7.6 |

$T^H_{1\rho}$ = the time constant for the spin/lattice relaxation of hydrogen nuclei as measured in the rotating frame.

The NMR results suggest the organization of the block copolymer at the membrane surface. The distinct relaxation times for PEO and PSF indicate two distinct physical domains within the membrane. After treatment with a D$_2$O solution of paramagnetic agent chromium (III) acetylacetonate (Cr(acac)$_3$), the relaxation associated with PEO was suppressed while the relaxation associated with PSF was unaffected. This is consistent with PEO being localized in domains accessible to the Cr(acac)$_3$ solution at the membrane surface, and PSF being localized in the interior membrane matrix.

EXAMPLE 5

A casting solution for hollow fiber membranes containing 10.0 weight percent PEO-PSF-PEO (a PEO:PSF::30:70 block copolymer), 15.0 weight percent PSF, 25.0 weight percent polyethylene glycol ($M_n$ 600) and 50.0 weight percent N-methyl pyrrolidinone was prepared. Hollow fibers were formed from the casting solution by spinning the solution at 55° C. at 100 feet per minute with nominal inner diameter of 200 μm and nominal outer diameter of 300 μm. The nominal wall thickness was 50 μm. The drop height, defined from the bottom of the spin nozzle to the level of the water in the coagulation bath, was 5 feet. The core solution was either pure water or a mixture of NMP and water. After collection on the take-up wheel, the fiber was extracted repeatedly in water. Post-treatment included soaking in various glycerol/water solutions ranging from 0 to 80% glycerol/water by weight, or thermally annealing the fiber in water for about 30 minutes at 120° C. (autoclave). The fibers were then air dried at room temperature overnight.

Membranes obtained in Example 5 were characterized via SEM and were further characterized by measurement of the pre-foul NaCl and Vitamin B-12 permeability and the bovine serum ultrafiltration coefficient, $K_{uf}$. The wettability of fibers made from casting solutions with and without triblock popolymer present is in Table III. Spinning conditions for the casting solution without the triblock copolymer were identical to those given above. The performance of the fiber soaked in the 80% glycerin solution represents the maximum obtainable for a fully-wetted membrane in both cases. For membranes made from casting solution containing only PSF and PEG 600, the wettability is lost or the performance is reduced at all other glycerin concentrations tested. When no wetting agent was used (i.e., pure water) the fiber collapsed when dried overnight. Performance therefore could not be measured. In contrast, the fiber made from casting solution containing PSF, PEG 600 and the PEO-PSF-PEO triblock copolymer maintained wettability or performance for all glycerin concentrations, including 5%. Furthermore, the autoclaved fiber containing no wetting agent also maintained wettability. Only the fiber that was air dried overnight with no wetting agent or autoclaving post treatment showed a reduction in performance and, thus, wettability. The use of the triblock copolymer in the casting solution greatly reduced or eliminated the need for glycerin as a wetting agent or a pore maintenance agent in hollow fibers. Membranes from Example 5 are contrasted to a PSF membrane made of 22% polysulfone, 30% PEG 600 and 48% NMP (see Table III).

Table V). N-methyl pyrrolidinone was used as the solvent for all the formulations and a coagulation bath consisting of $H_2O$ at 50° C. PEO-b-PSF can be used to formulate membranes whose molecular weight cutoff ranges from >2,000 kD (i.e. 5% PMX30-5B13/5% PSF) to 20 kD (i.e. 10% PMX30-5B13/15% PSF). An asterisk (*) indicates that the membrane was tested at 55 psi, and the reported flux was normalized to 10 psi. The following abbreviations were used: BLDex=Blue Dextran, Mn ≈2,000 kD, BSA=Bovine Serum Albumin, Mn=67 kD, Cyt-C=Cytochrome C, Mn=12.4 kD. Solvent (NMP) formed the balance of each formulation. All were cast (8 mil) on nonwoven polypropylene fabric (Freudenberg) and coagulated in $H_2O$ at 50° C.

TABLE III

SOLUTE PERMEABILITY

| Fiber I.D. (n = 2 for all bundles) | Wetting Agent | Bovine Serum $K_{uf}$ (ml/h/mmHg/m$^2$) | NaCl perm. (cm/min × 10$^2$) | B12 perm. |
|---|---|---|---|---|
| Fiber made from 22% PSF, 30% PEG600 casting solution (no triblock copolymer) | | | | |
| wh4c9-1c-10 | 80% glycerin | 49.3 | 7.38 | 1.89 |
| wh4c10-3b-5 | 40% glycerin | 46.0 | 5.03 | 1.35 |
| wh4c10-8a-6 | 30% glycerin | 33.1 | 2.24 | 0.71 |
| wh4c10-9a-5 | None (water) | fiber collpased could not measure properties | | |
| Fiber made from 10% PEO-PSF-PEO triblock, 15% PSF, 25% PEG 600 casting solution | | | | |
| 17593-195-1 | 80% glycerin | 51.6 | 6.78 | 1.57 |
| 17583-195-3 | 30% glycerin | 47.0 | 6.52 | 1.50 |
| 17593-195-4 | 5% glycerin | 50.5 | 6.55 | 1.55 |
| 17593-195-3a | None (water) | 1.1 | 2.95 | 0.60 |
| 17593-195-5 | None, autoclaved* | 59.0 | 6.60 | 1.54 |

*fiber was autoclaved at 120° C. for 30 minutes

The membrane of the present invention retains remarkable performance when treated with a low concentration of glycerol whereas the conventional PSF membrane requires treatment with 80% glycerol for similar performance. More importantly, thermal annealing alone produces superior performance. Some flow is retained even when the disclosed membrane is merely air-dried. Treatment of the PSF-only membrane with 5% glycerol or autoclave can also be determined.

The solute rejection and protein recovery rate of membranes made according to Examples 2 and 3 were calculated by measuring the concentration of the starting solution, the retained solution and the filtrate. Table IV shows the results thereof.

TABLE IV

SOLUTE REJECTION AND PROTEIN RECOVERY

| Ex. | Water Perm. (ml/min/cm$^2$) | Cyto-C Rej. | Protein Recovery |
|---|---|---|---|
| 2 | 0.74 | 16.4% | 94.0% |
| 3 | 1.11 | 9.4% | 97.1% |

Scanning electron micrographs show that this polymer membrane is porous, with a homogeneous, spongy, and asymmetric cross section with a thickness between 180 and 200 μm. The pores range between 0.05 and 2.0 μm in diameter.

EXAMPLE 6

A survey of casting solution compositions incorporating PEO-b-PSF and polysulfone (Udel 3500) was made (see for 5 minutes, then removed for exhaustive extraction in $H_2O$. All membranes were dried from a 30% glycerin solution. Reported rejections were calculated from the filtrated concentration for a single solute half reduction test.

TABLE V

SOLUTE REJECTION
PMX30-5B13
(22.5% PEO, 77.5% PSF, Mn 56.6 kD)

| PSF | | 5% | 10% | 15% | 15% |
|---|---|---|---|---|---|
| 5% | BLDeX | 8% | 96% | 99% | 98% |
| | BSA | 10% | 44% | 99% | 96% |
| | Cyt-C | 7% | 12% | 20% | 7% |
| | $H_2O$ flux | 9.58 | 1.24 | 0.28 | 0.49 |
| | | σ = 2.82 | σ = 0.18 | σ = 0.03 | σ = 0.05 |
| 10% | BLDex | 74% | 100% | 98% | |
| | BSA | 20% | 99% | 98% | |
| | Cyt-C | 9% | 15% | 9% | |
| | $H_2O$ flux | 2.65 | 0.50 | 0.21 | |
| | | σ = 0.52 | σ = 0.13 | σ = 0.03 | |
| 15% | BLDex | 99% | 100% | 83% | |
| | BSA | 98% | 100% | 99% | |
| | Cyt-C | 38% | 50% | 31% | |
| | $H_2O$ | 0.19 | 0.25 | 0.07 | |
| | | σ = 0.02 | σ = 0.02 | σ = 0.02 | |

EXAMPLE 7

The effect of thermal treatments of a 10% PEO-b-PSF/ 10% PSF membranes was explored (see Table VI). As the temperature of the aqueous coagulation bath increased, the $H_2O$ flux increased and the recovery of Cytochrome-C increased (row 3, 30% glycerin treated membrane). The increasing recovery of Cyt-C reflected a decrease in adsorption of the protein. The effect of protein adsorption was much more easily seen for the smaller solute as it substantially passed through the membrane and was thus exposed to the full active surface of the membrane. The decrease in protein adsorption resulted from an enhanced surface enrichment of PEO active surface segments.

Membranes were also thermally treated after fabrication to improve the PEO surface enrichment (column 1, membrane 3845-52). Membranes which were placed in a water bath at 50° C. for 24 hour, and then either air dried or dried from glycerin had a markedly improved Cyt-C recovery compared to the membrane which received no thermal post-treatment. This information supports the enhanced surface enrichment of PEO after thermal annealing. Furthermore, the measurable flow and rejection of the air dried membrane demonstrate the enhanced wettability of the thermally treated membrane. There was no measurable flow for the membrane which was not thermally treated. A more vigorous thermal treatment in a 120° C. water bath for 30 minutes (autoclave) yielded a membrane with surprising qualities. In addition to improved protein recovery and a more open pore structure, this membrane fully recovered its water permeability without added glycerol or surfactant. In Table VI, block copolymer 3845-53 contained 22.2% PEO, and was 51.4 kD. Block copolymer 3791-16A1 contained 23.5% PEO, and was 56.6 kD.

TABLE VII

REFLECTANCE SPECTROSCOPY

| Drying Cond'n | Solute | 3845-52 coag 65° F. (18° C.) Rec | rel (Abs) | 3845-53 coag 90° F. (32° C.) Rec. | rel (Abs) | 3791-16A1 coag 122° F. (50° C.) Rec | rel (Abs) |
|---|---|---|---|---|---|---|---|
| wet | Cyt-C | 93% | 15.05 | 93% | not tested | | |
| 30% Gly | Cyt-C | 91% | 15.68 | 93% | 13.91 | 98% | 10.93 |
| 50° C. 24 hr air dry | Cyt-C | 99% | 2.72 | | | | |
| 50° C. 24 hr 25% Gly | Cyt-C | 99% | 1.53 | | | | |
| 120° C. 30 min air dry | Cyt-C | 989% | 1.53 | | | | |

TABLE VI

THERMAL ANNEALING
10% PSF/10% PEO-b-PSF/80% NMP

| coag 65° F. Drying Condition | | 3845-52 coag 90° F. (18° C.) R_fi Rec. | | 3845-53 coag 122° F. (32° C.) R_fi Rec. | | 3791-16A1 (50° C.) R_fi Rec | |
|---|---|---|---|---|---|---|---|
| wet | BSA | 99.6% | (99%) | 97.8% | (99%) | not tested | |
| | Cyt-C | 28.3% | (93%) | 24.3 | (96%) | | |
| | H₂O flux | 0.30 | | | | | |
| air dry | BSA | no flow | | no flow | | — | |
| | Cyt-C | | | — | | | |
| | H₂O flux | | | | | 0.01 | |
| 30% Gly | BSA | 99.7% | (98%) | 99.3%) | (100%) | 99% | (100%) |
| | Cyt-C | 27.3% | (91%) | 22.9% | (93%) | 15% | (98%) |
| | H₂O flux | 0.17 | | 0.25 | | 0.50 | |
| 50° C. 24 hr air dry | BSA | 99.1% | (100% | | | | |
| | Cyt-C | 80.0% | (99%) | | | | |
| | H₂O flux | 0.1 @ 55 psi | | | | | |
| 50° C. 24 hr 25% Gly | BSA | 99.7% | (100% | | | | |
| | Cyt-C | 9.2% | (99%) | | | | |
| | H₂O flux | 0.19 | | | | | |
| 120° C. 30 min air dry | IgG | | | 97.7% | (100%) | | |
| | BSA | (98%) | | 35.5% | (98%) | | |
| | Cyt-C | (98%) | | — | | | |
| | H₂O flux | | | 0.31 | | | |

EXAMPLE 8

Reflectance spectroscopy provided a complementary measure of Cyt-C adsorption to the membrane (see Table VII). Increasing spectral absorbance indicated increasing amounts of adsorbed protein.

Other Embodiments

From the above description, the essential characteristics of the present invention can be ascertained. Without departing from the spirit and scope thereof, various changes and modifications can be made to adapt to various usages and conditions.

For example, a tetrablock or pentablock copolymer including poly(ethyleneoxy) and a hydrophobic block segment such as but not limited to those described herein is also within the scope of the claims. Similarly, by adjusting the solvents and additives, a non-porous dense film may be made with the recited block copolymers. In addition, poly

What is claimed is:

1. A porous polymer article with a covalently-bonded hydrophilic moiety present on its active surface comprising
   a copolymer selected from the group consisting of a hydrophilic-hydrophobic diblock copolymer and a hydrophilic-hydrophobic-hydrophilic triblock copolymer, or a combination of said diblock copolymer and triblock copolymer; and
   a hydrophobic polymer;
   wherein a hydrophobic moiety of said diblock or triblock copolymer is miscible with and mixes with said hydrophobic polymer to form a polymer matrix, and a covalently-bonded hydrophilic moiety of said diblock or triblock copolymer is present on the active surface of said polymer article.

2. A porous polymer article of claim 1, wherein said diblock or triblock copolymer is of the formula (I):

wherein R is $C_{1-20}$ alkyl, $C_{7-20}$ alkylaryl, $C_{7-20}$ arylalkyl, or $C_{1-20}$ perfluoroalkyl;

n is between 20 and 500;

X is $-Z^1-(OAr^1OAr^2)_m-$ or $-(OAr^2OAr^1)_m-$; and

Y is hydroxy, $-(OAr^3O)-Z^2-(CH_2CH_2O)_p-R^1$, or $-(OAr^4O)-(CH_2CH_2O)_p-R^1$;

in which $Z^1$ is selected from $-N(R^2)-(SO_2)-C_6H_4-$ and $-N(R^2)-(C=O)-C_6H_4-$, $R^2$ being $C_{1-12}$ alkyl or $C_{6-20}$ aryl;

$Z^2$ is selected from $-C_6H_4-(SO_2)-N(R^3)-$ and $-C_6H_4-(C=O)-N(R^3)-$, $R^3$ being $C_{1-12}$ alkyl or $C_{6-20}$ aryl;

$R^1$ is $C_{1-20}$ alkyl, $C_{7-20}$ alkylaryl, $C_{7-20}$ arylalkyl, or $C_{1-20}$ perfluoroalkyl;

each of $Ar^1$ and $Ar^3$ is independently selected from 1,4-phenylene, 1,3-phenylene, naphthyl-1,4-diyl, naphthyl-1,5-diyl, 4,4'-biphenylene, diphenyl ether-4,4'-diyl, diphenylthioether-4,4'-diyl, diphenylisopropylidene-4,4'-diyl, diphenylhexafluoroisopropylidene-4,4'-diyl, diphenylalkylene-4,4'-diyl wherein alkylene is $-(CH_2)_q-$, q being 1, 3, 5, 7 or 9, p-terphenyl-4,4'-diyl, and bivalent radicals of binaphthalene, anthracene, and phenylnaphthalene;

each of $Ar^2$ and $Ar^4$ is independently selected from diphenylsulfoxide-4,4'-diyl, diphenylsulfone-4,4'-diyl, diphenyl ketone-4,4'-diyl, and bivalent radicals of diphenyl-$C_{1-12}$ alkyl phosphine oxide and diphenyl-$C_{6-20}$ aryl phosphine oxide;

m is between 1 and 250; and p is between 20 and 500.

3. A porous polymer article of claim 1 having up to 80% by weight of said block copolymer.

4. A porous polymer article of claim 2, wherein $Z^1$ is $-N(R^2)-(SO_2)-C_6H_4-$ and $Z^2$ is $-C_6H_4-(SO_2)-N(R^2)-$.

5. A porous polymer article of claim 2, wherein $Ar^2$ is diphenylsulfone-4,4'-diyl.

6. A porous polymer article of claim 5, wherein each of R and $R^1$ is independently selected from lauryl, myristyl, palmityl, stearyl, cetyl, methyl, phenyl, octylphenyl, nonylphenyl, and perfluoroalkyl.

7. A porous polymer article of claim 5, wherein said block copolymer is selected from the group consisting of methyl poly(oxyethylene)-b-poly(aryl ether sulfone), methyl poly(oxyethylene)-b-poly(aryl ether sulfone)-b-poly(ethyleneoxy)methyl, phenyl poly(oxyethylene)-b-poly(aryl ether sulfone), phenyl poly(oxyethylene)-b-poly(aryl ether sulfone)-b-poly(ethyleneoxy)phenyl, stearyl poly(oxyethylene)-b-poly(aryl ether sulfone), stearyl poly(oxyethylene)-b-poly(aryl ether sulfone)-b-poly(ethyleneoxy)stearyl, cetyl poly(oxyethylene)-b-poly(aryl ether sulfone), cetyl poly(oxyethylene)-b-poly(aryl ether sulfone)-b-poly(ethyleneoxy)cetyl, lauryl poly(oxyethylene)-b-poly(aryl ether sulfone), lauryl poly(oxyethylene)-b-poly(aryl ether sulfone)-b-poly(ethyleneoxy)lauryl, octylphenyl poly(oxyethylene)-b-poly(aryl ether sulfone), octylphenyl poly(oxyethylene)-b-poly(aryl ether sulfone)-b-poly(ethyleneoxy)phenyloctyl, nonylphenyl poly(oxyethylene)-b-poly(aryl ether sulfone)-b-poly(ethyleneoxy)phenylnonyl, perfluoroalkyl poly(oxyethylene)-b-poly(aryl ether sulfone), and perfluoroalkyl poly(oxyethylene)-b-poly(aryl ether sulfone)-b-poly(ethyleneoxy)perfluoroalkyl, or a mixture thereof.

8. A porous polymer article of claim 2, wherein the weight ratio $(OCH_2CH_2):(OAr^1OAr^2)+(OAr^2OAr^1)$ of said block copolymer is between 5:1 and 1:20.

9. A porous polymer article of claim 1, wherein said hydrophobic polymer is selected from the group consisting of polyacrylonitrile, polyvinyl halide, polyvinylidene halide, polyimide, polyetherimide, polyamide, a polymer of $-(OAr^1OAr^2)-$, and copolymers thereof.

10. A porous polymer article of claim 9, wherein said hydrophobic polymer is a polymer or copolymer of $-(OAr^1OAr^2)-$, wherein $Ar^2$ is diphenylsulfone-4,4'-diyl.

11. A porous polymer article of claim 1, wherein said copolymer is a hydrophilic-hydrophobic-hydrophilic triblock copolymer.

12. A porous polymer article of claim 2, wherein Y is $-(OAr^3O)-Z^2-(CH_2CH_2O)_p-R^1$ or $-(OAr^4O)-(CH_2CH_2O)_p-R^1$.

13. A porous polymer article of claim 11 having up to 80% by weight of said block copolymer.

14. A porous polymer article of claim 12, wherein $Z^1$ is $-N(R^2)-(SO_2)-C_6H_4-$ and $Z^2$ is $-C_6H_4-(SO_2)-N(R^2)-$.

15. A porous polymer article of claim 12, wherein $Ar^2$ is diphenylsulfone-4,4'-diyl.

16. A porous polymer article of claim 15, wherein each of R and $R^1$ is independently selected from lauryl, myristyl, palmityl, stearyl, cetyl, methyl, phenyl, octylphenyl, nonylphenyl, and perfluoroalkyl.

17. A porous polymer article of claim 15, wherein said block copolymer is selected from the group consisting of methyl poly(oxyethylene)-b-poly(aryl ether sulfone)-b-poly(ethyleneoxy)methyl, phenyl poly(oxyethylene)-b-poly(aryl ether sulfone)-b-poly(ethyleneoxy) phenyl, stearyl poly(oxyethylene)-b-poly(aryl ether sulfone)-b-poly(ethyleneoxy)stearyl, cetyl poly(oxyethylene)-b-poly(aryl ether sulfone)-b-poly(ethyleneoxy) cetyl, lauryl poly(oxyethylene)-b-poly(aryl ether sulfone)-b-poly(ethyleneoxy)lauryl, octylphenyl poly(oxyethylene)-b-poly(aryl ether sulfone)-b-poly(ethyleneoxy) phenyloctyl, nonylphenyl poly(oxyethylene)-b-poly(aryl ether sulfone)-b-poly(ethyleneoxy)phenylnonyl, and perfluoroalkyl poly(oxyethylene)-b-poly(aryl ether sulfone)-b-poly(ethyleneoxy)perfluoroalkyl, or a mixture thereof.

18. A porous polymer article of claim 12, wherein the weight ratio $(OCH_2CH_2):(OAr^1OAr^2)+(OAr^2OAr^1)$ of said block copolymer is between 5:1 and 1:20.

19. A porous polymer article of claim 11, wherein said hydrophobic polymer is selected from the group consisting of polyacrylonitrile, polyvinyl halide, polyvinylidene halides polyimide, polyetherimide, polyamide, a polymer of —$(OAr^1OAr^2)$—, and copolymers thereof.

20. A porous polymer article of claim 19, wherein said hydrophobic polymer is a polymer or copolymer of —$(OAr^1OAr^2)$—, wherein $Ar^2$ is diphenylsulfone-4,4'-diyl.

* * * * *